(12) United States Patent
Narumi et al.

(10) Patent No.: US 7,110,218 B2
(45) Date of Patent: Sep. 19, 2006

(54) INDUCTIVE HEAD AND MAGNETIC DISK APPARATUS

(75) Inventors: Shunichi Narumi, Kodaira (JP); Hiroyuki Hoshiya, Odawara (JP); Yohji Maruyama, Iruma (JP)

(73) Assignee: Hitachi Global Storage Technologies Japan, Ltd., Kanagawa (JP)

(*) Notice: Subject to any disclaimer, the term of this patent is extended or adjusted under 35 U.S.C. 154(b) by 0 days.

(21) Appl. No.: 10/791,858

(22) Filed: Mar. 4, 2004

(65) Prior Publication Data

US 2004/0165310 A1    Aug. 26, 2004

Related U.S. Application Data

(62) Division of application No. 09/811,437, filed on Mar. 20, 2001, now Pat. No. 6,721,132.

(30) Foreign Application Priority Data

Jul. 24, 2000    (JP) .............................. 2000-227531

(51) Int. Cl.
*G11B 5/147* (2006.01)
(52) U.S. Cl. .................................... 360/126
(58) Field of Classification Search ................ 360/126, 360/125, 119, 110
See application file for complete search history.

(56) References Cited

U.S. PATENT DOCUMENTS

| | | | |
|---|---|---|---|
| 5,245,493 A | 9/1993 | Kawabe et al. | 360/126 |
| 5,617,278 A | 4/1997 | Chang et al. | 360/126 |
| 5,652,687 A | 7/1997 | Chen et al. | 360/126 |
| 5,828,533 A | 10/1998 | Ohashi et al. | 360/126 |
| 5,872,693 A * | 2/1999 | Yoda et al. | 360/126 |
| 6,130,805 A * | 10/2000 | Sasaki et al. | 360/126 |
| 6,151,193 A | 11/2000 | Terunuma et al. | 360/126 |
| 6,169,642 B1 * | 1/2001 | Mino et al. | 360/126 |
| 6,490,125 B1 * | 12/2002 | Barr | 360/126 |
| 6,612,017 B1 * | 9/2003 | Santini | 29/603.12 |
| 6,657,816 B1 * | 12/2003 | Barr et al. | 360/126 |
| 6,680,815 B1 * | 1/2004 | Sasaki | 360/126 |

(Continued)

FOREIGN PATENT DOCUMENTS

JP    07-296328    11/1995

OTHER PUBLICATIONS

S. Narumi et al., "Simulation of the write field for T-shaped pole heads," *J. Applied Physics*, vol. 87, No. 9, Parts 2 and 3, May 1, 2000, p. 5419-5421.

*Primary Examiner*—Julie Anne Watko
(74) *Attorney, Agent, or Firm*—Antonelli, Terry, Stout and Kraus, LLP.

(57) ABSTRACT

In a convention inductive head, since a large magnetic field is leaked from the end of the magnetic pole end of an upper magnetic core, at recording the recording magnetic field is applied to a recording media in a region larger than a desired track width, thereby damaging the adjacent information. In an inductive head according to the present invention, in order to efficiently carry a magnetic flux to a magnetic pole tip layer, the top surface of the rear end of the magnetic pole tip layer is etched away so as to connect the rear end of the magnetic pole tip layer to the front end of an upper magnetic core having a width larger than that of the rear end of the magnetic pole tip layer. It is possible to realize a recording head having a large recording magnetic field.

6 Claims, 7 Drawing Sheets

U.S. PATENT DOCUMENTS

| | | |
|---|---|---|
| 2002/0048117 A1 | 4/2002 | Ostrowski et al. .......... 360/126 |
| 2002/0060878 A1 | 5/2002 | Kamijima ................... 360/126 |
| 2002/0080523 A1* | 6/2002 | Sato et al. .................. 360/126 |
| 2002/0191350 A1* | 12/2002 | Emilio Santini ............ 360/317 |

* cited by examiner

INDUCTIVE HEAD AND MAGNETIC DISK APPARATUS

CROSS-REFERENCE TO RELATED APPLICATION

This is a division of U.S. application Ser. No. 09/811,437 filed 20 Mar. 2001, now U.S. Pat. No. 6,721,132, the contents of which are incorporated herein by reference in their entirety.

BACKGROUND OF THE INVENTION

1. Field of the Invention

The present invention relates to an inductive head for use in magnetic recording.

2. Description of the Related Art

With increasing recording density of magnetic disk apparatuses, magnetic recording media enhance the coercivity, and the track width of inductive heads for use in recording is made smaller. In addition, as the coercivity of the magnetic recording media is made higher, the thickness of the inductive heads is increased in order to provide a magnetic flux enough for recording. At present, the thickness of the front end of an upper magnetic core of the inductive heads is increased as compared with the track width, thereby making it more difficult to manufacture them.

In order to solve the problems, Japanese Un-examined Patent Publication No. Hei 7(95)-296328 describes the structure of an inductive head having a trench with a smaller width than the width of the magnetic pole end of the upper magnetic core of the inductive head, and the width of the trench is defining a track width.

As described above, in the inductive head described in Japanese Un-examined Patent Publication No. Hei 7(95)-296328, the width of the magnetic pole end of the upper magnetic core is larger than the magnetic pole tip layer defining the track width. This structure can maintain the large magnetic flux on the front end of the upper magnetic core, so as to manufacture a magnetic pole tip layer having a small thickness and a track width with high precision. However, a large magnetic field is leaked not only from the magnetic gap portion but also from the front end portion of the upper magnetic core. At recording, the recording magnetic field is applied to the recording media in a region wider than a track width desired, thereby damaging adjacent information.

As one of means of solving the problem, in order to reduce the magnetic field leaked from the magnetic pole end portion of the upper magnetic core, the upper magnetic core is constructed such that the magnetic pole end surface thereof is recessed from the air bearing surface. However, in this case, as the magnetic field leaked is reduced, the recording magnetic field is small.

SUMMARY OF THE INVENTION

In order to realize a small track width, an inductive head according to the present invention forms a magnetic pole tip layer having a substantially track width at least near the air bearing surface between an upper magnetic core and a lower magnetic core.

In order to efficiently carry the magnetic flux to the magnetic pole tip layer, the top surface of the rear end of the magnetic pole tip layer is milled, and then the rear end of the magnetic pole tip layer is connected to the front end of the upper magnetic core having a width larger than that of the rear end of the magnetic pole tip layer, so as to realize a recording head having a large recording magnetic field.

When the front end of the upper magnetic core is exposed from the air bearing surface of the magnetic head, the magnetic field leaked from the both side of front end of the upper magnetic core can damage information of the adjacent track. In order to avoid this, in the recording head of the present invention, the front end of the upper magnetic core is desirably recessed from the air bearing surface by 0.2 to 3.0 μm.

DETAILED DESCRIPTION OF THE PREFERRED EMBODIMENTS

Figure 1A:
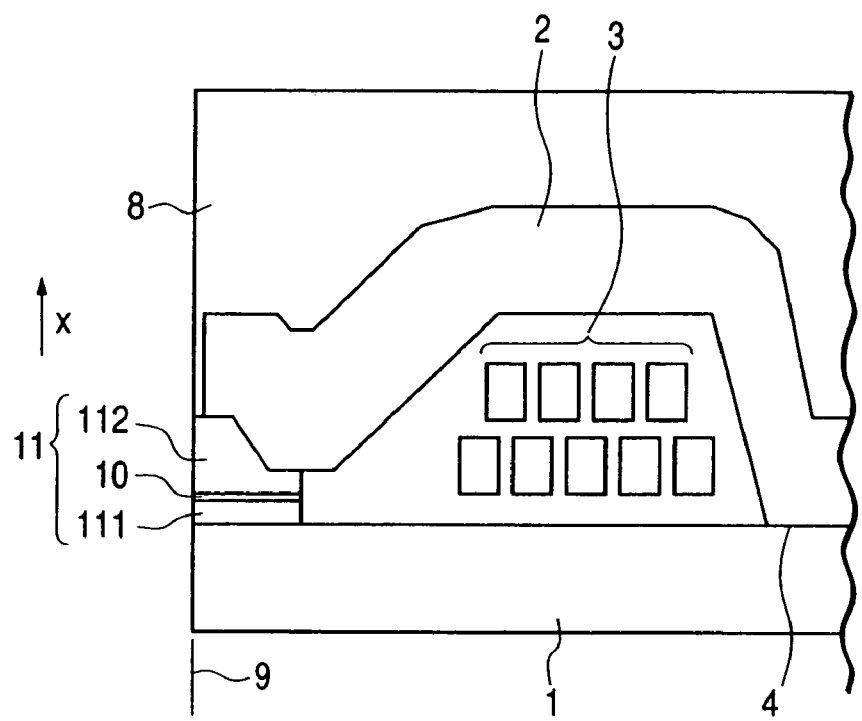
FIGS. 1(a)–(b) are an embodiment of an inductive head according to the present invention.
Figure 1B:
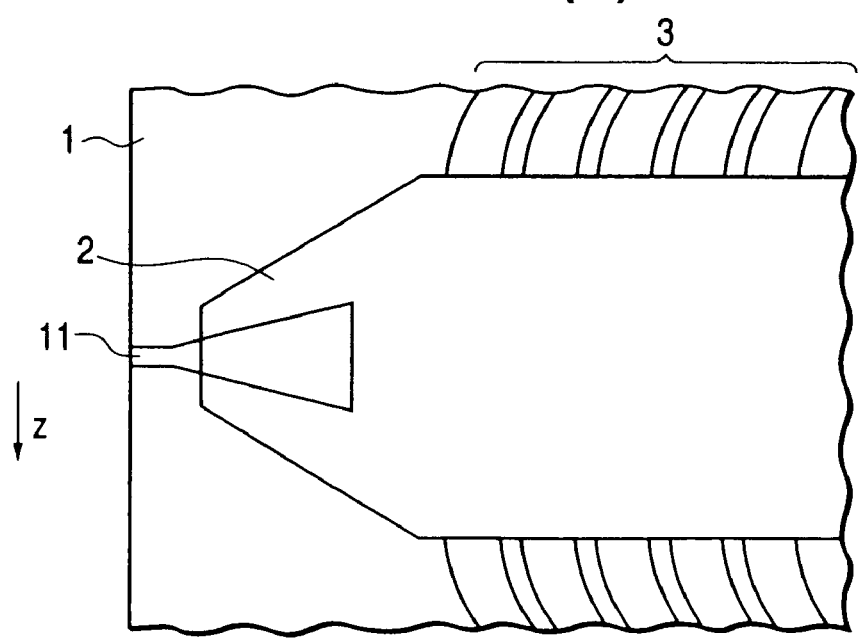

Embodiments of the present invention will be described based on the examples with reference to the drawings. FIGS. 1(a)–(b) are model diagrams of the inductive head according to the present invention, in which FIG. 1(a) is a cross-sectional view of the inductive head according to the present invention, and FIG. 1(b) is a top view viewed from the top surface parallel to x direction shown in FIG. 1(a). As shown in FIG. 1(a), the inductive head of the present invention comprises a lower magnetic core 1 on a substrate, an upper magnetic core 2, and coils 3 disposed around between the lower magnetic core and the upper magnetic core, the lower magnetic core 1 and the upper magnetic core 2 being connected by a back contact portion 4 in the rear end, and being connected through a magnetic pole tip layer 11 in the front end. The magnetic pole tip layer 11 comprises a layer made by laminating a lower side layer of the magnetic pole tip layer 111, a magnetic gap layer 10, and an upper side layer of the magnetic pole tip layer 112. The distance from the lower magnetic core 1 to the top surface of the magnetic pole tip layer 11 of the rear end is smaller than that of the front end, and at least the rear end of the magnetic pole tip layer 11 is connected to the front end of the upper magnetic core 2. The width of the front end of the upper magnetic core 2 is desirably larger than that of the rear end of the magnetic pole tip layer 11. Thus, the magnetic flux is effectively flowed to the magnetic pole tip layer so as to provide an inductive head giving a high recording magnetic field.

Figures 2A, 2B, 2C, 2D:
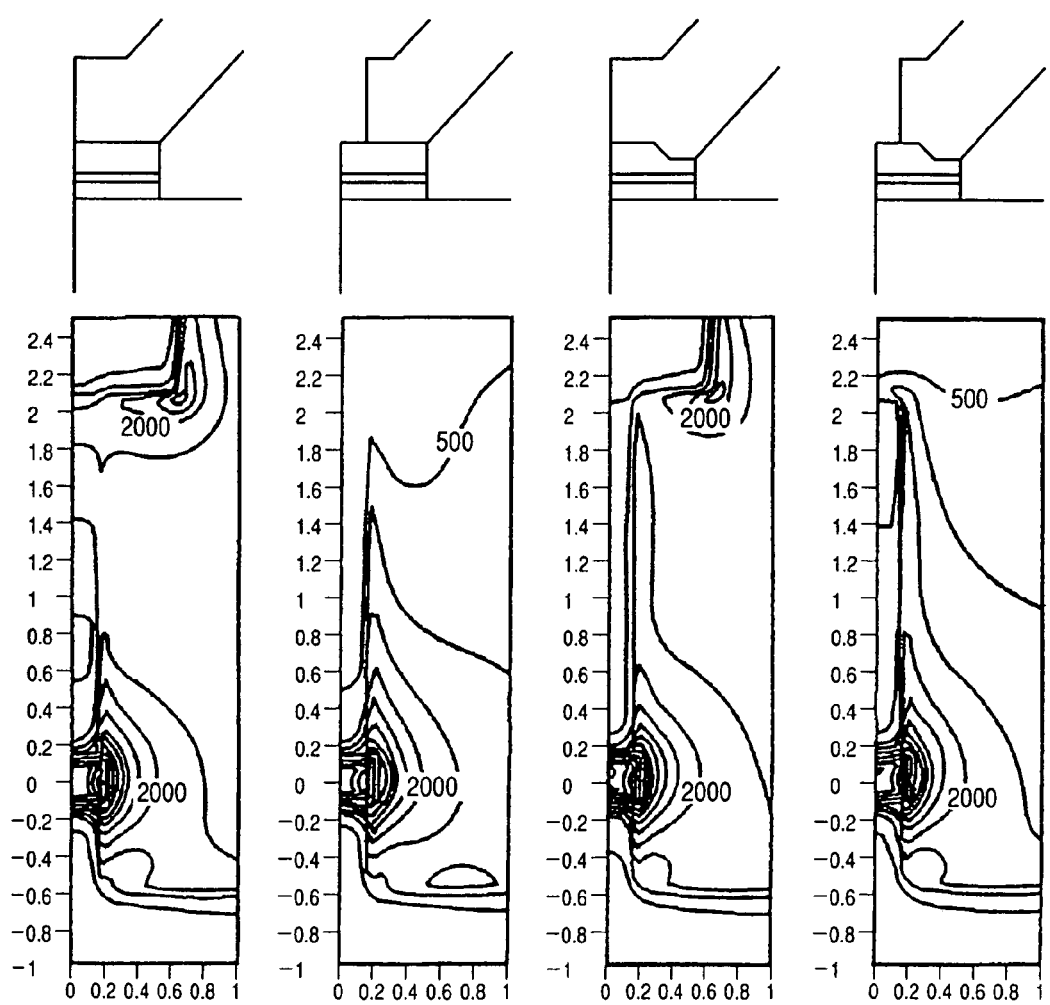
FIGS. 2(a)–(d) are contour line diagrams of the in-plane components of the magnetic field intensity of the inductive heads according to the present invention and the comparative examples.

FIGS. 2(c) and 2(d) show examples of the distribution of the recording magnetic fields of the inductive head of the present invention. For comparison, FIGS. 2(a) and 2(b)

show examples of the distribution of the recording magnetic fields of a conventional inductive head. In either case, the thickness of the lower side layer of the magnetic pole tip layer is 0.5 μm, the thickness of the gap layer is 0.2 μm, and the thickness of the upper side layer of the magnetic pole end layer is 2.0 μm. The saturation magnetic flux density Bs is 1.9T and the specific permeability μ of the lower side layer and the upper side layer of the magnetic pole tip layer is 1500 of Co—Ni—Fe. The write field distributions Hxz in the medium plane are calculated using a three-dimensional magnetic field simulator by Maxwell's equations in integral form. In the magnetic pole tip layer, the width from the front end to 0.5 μm is 0.34 μm, and then the shape is extended at a 20° angle to 3.0 μm. A difference between the length of the magnetic pole tip layer and an amount recession of the front end of the upper magnetic core from the air bearing surface is a contact length of the magnetic pole tip layer with the upper magnetic core. In either case, when the contact length of the magnetic pole tip layer with the upper magnetic core is up to 5.0 μm, the longer the contact length, the larger the magnetic field becomes. In addition, as an amount of recession of the front end of the upper magnetic core from the air bearing surface is increased, the maximum magnetic field and the magnetic field leaked from the end of the upper magnetic core are reduced. The maximum magnetic field is reduced abruptly when an amount of recession of the front end of the upper magnetic core exceeds 3.0 μm, and the magnetic field leaked from the end of the upper magnetic core is almost constant when an amount of recession is not less than 0.2 μm. Thus, desirably, an amount of recession of the front end of the upper magnetic core is 0.2 to 3.0 μm, and the length of the magnetic pole end layer is 2.0 to 7.0 μm.

As in this embodiment, when the magnetic pole tip layer has a three-layer structure of magnetic layer/non-magnetic layer/magnetic layer, and the three layers have the same shape viewed from the top, the angle of extension is 5 to 45°, so as to increase the recording magnetic field.

In the upper magnetic core, a width from the air bearing surface to 0.5 μm is 1.34 μm, and then the shape is extended at the angle of extension of 40° to the core width of 30 μm. The lower magnetic core has a thickness of 2.5 μm, and the upper magnetic core has a thickness of 3.0 μm. The lower magnetic core and the upper magnetic core have Bs=1.6 T of 45Ni-55Fe, and μ=1600. The magnetomotive force is 0.36 At, and recording magnetic field distribution in the medium plane in the position 25 nm away from the air bearing surface is calculated using a three-dimensional magnetic field simulator by Maxwell's equations in integral form. The calculated results are shown in contour line diagrams for each about 40 kA/m (5000e). The sectional shapes of the front ends of the models are shown above the contour line diagrams. In the diagram, the vertical direction indicates a down track direction, the horizontal direction indicates a track width direction, and the numerals are in μm.

In FIG. 2(a) as one example for comparison, the front end of the magnetic pole tip layer has the same thickness as that of the rear end thereof, and the front end of the upper magnetic core is exposed to the air bearing surface. The maximum magnetic field is 633 kA/m (7.97 kOe), and the magnetic field leaked from the both side of the front end of the upper magnetic core is large and 252 kA/m (3.18 kOe), so that information of the adjacent track can be damaged.

In FIG. 2(b) as another example for comparison, the front end of the magnetic pole tip layer has the same thickness as that of the rear end thereof, and the front end of the upper magnetic core is recessed from the air bearing surface by 1.0 μm. The magnetic field leaked from the both side of the front end of the upper magnetic core is reduced to not more than 79 kA/m (1000 Oe), and the maximum magnetic field is reduced to 625 kA/m (7.88 kOe).

FIG. 2(c) shows the inductive head according to the present invention wherein the front end of the upper magnetic core is exposed to the air bearing surface. The maximum magnetic field is 647 kA/m (8.15 kOe), and the magnetic field leaked from the both side of the front end of the upper magnetic core is 216 kA/m (2.72 kOe). As compared with FIG. 2(a) as one example of the conventional inductive head, it is found that the maximum magnetic field is increased, and the magnetic field leaked from the upper magnetic core is reduced.

FIG. 2(d) shows the inductive head according to the present invention wherein the front end of the upper magnetic core is recessed from the air bearing surface by 1.0 μm. The magnetic field leaked from the both side of the front end of the upper magnetic core is reduced to not more than 79 kA/m (1000 Oe), and the maximum magnetic field is 642 kA/m (8.09 kOe). As compared with FIG. 2(b) as another example of the conventional inductive head, it is found that the maximum magnetic field is large. With respect to the shape of FIG. 2(d), when the lower and upper magnetic pole end layers have Bs=2.3 T of 70Fe-30Co, and μ=100, the maximum magnetic field is increased to 717 kA/m (9.03 kOe). When the track width is 0.6 μm, it is increased to 788 kA/m (9.93 kOe). The thickness of the magnetic gap layer and the shape of the magnetic pole tip layer are optimized, so that it is expected that the maximum magnetic field is increased by about 79 kA/m (1.0 kOe) or furthermore.

In the inductive head of the present invention, a recording head having a small track width of 0.3 to 0.6 μm permits recording onto a media having a coercivity of 317 to 476 kA/m (4.0 to 6.0 kOe) at a high S/N and recording density.

FIGS. 3(a)–(d) show one example of a method of manufacturing the inductive head according to the present invention.

The lower magnetic core 1 is formed on a substrate 6, and then a frame mask for forming the magnetic pole tip layer is formed, so as to define the lower magnetic pole tip layer 111, the magnetic gap layer 10, and the upper magnetic pole tip layer 112 by a plating method. Thereafter, the unnecessary portion of the plating layer and the frame mask are removed (FIG. 3(a)). When a magnetoresistive head, a spin valve head, or a giant magnetoresistive head is used as the reproducing head, the lower magnetic core and the upper shield may be used together, or a non-magnetic layer 5 (FIG.3(b)) may be interposed between the layers to be separated.

Coils of the first layer are formed, and then an insulating layer such as Al2O3, SiO2, or resist is formed. After flattening treatment by a chemical mechanical polishing method, the rear portion of the upper magnetic pole tip layer 112 is etched away using ion milling, reactive ion etching (R.I.E.), or wet etching (FIG. 3(c)).

In this case, the rear portion of the upper magnetic pole tip layer may be etched away without flattening treatment (FIG. 3(c')). Flattening treatment makes the process complicate, but a desired shape can be easily given. The magnetic pole tip layer 11 may be formed before forming the coils.

Figure 3A:
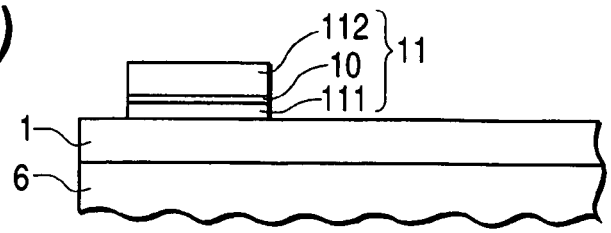
FIGS. 3(a)–(d') are diagrams showing a method of manufacturing the inductive head according to the present invention.
Figure 3B:
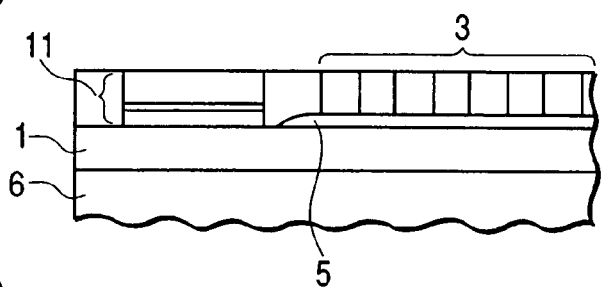
Figure 3C:
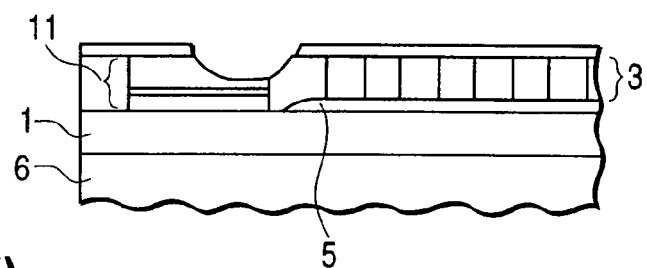
Figure 3C:
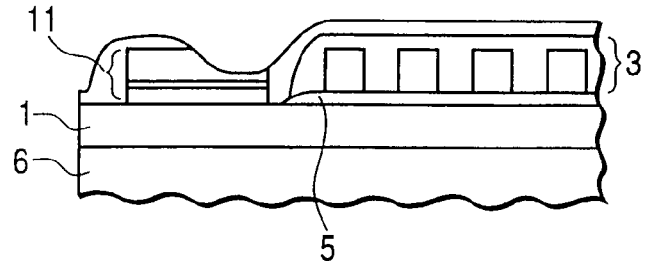
Figure 3D:
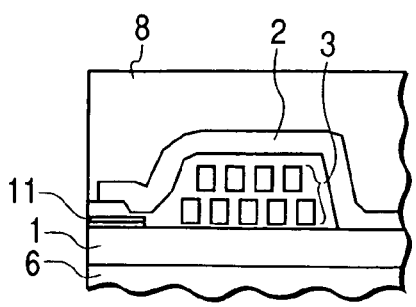
Figure 3D:
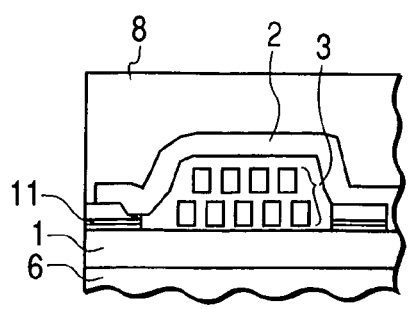

Subsequently, coils of the second layer and so on are formed, a through hole for the back contact is formed, the upper magnetic core 2 is formed, and finally the protective layer is formed (FIG. 3(d)). The back contact portion may employ the plating layer at forming the magnetic pole tip layer (FIG. 3(d')), or may be formed with a new magnetic layer.

Figure 4A:
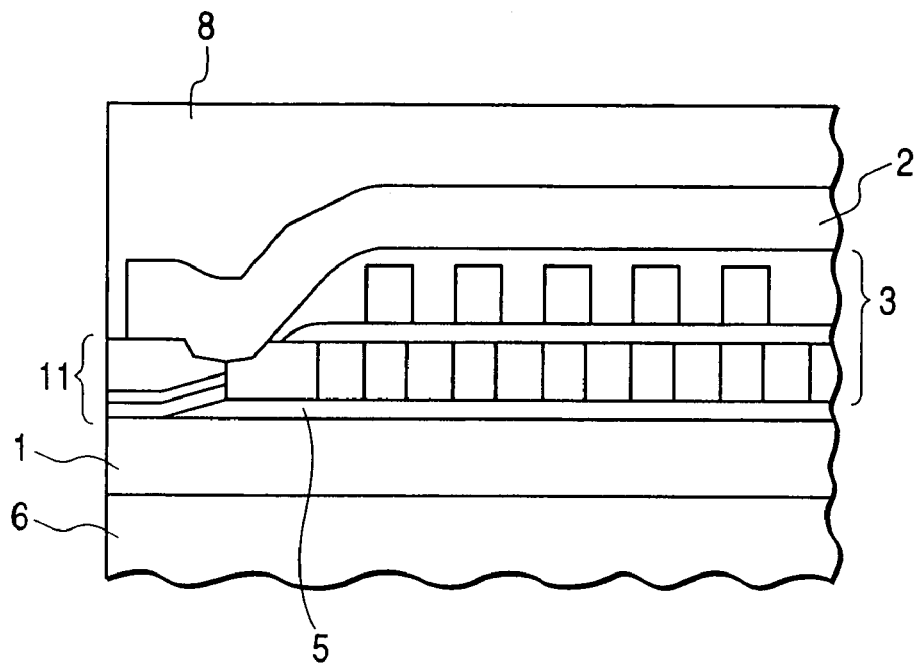
FIGS. 4(a)–(b) are cross-sectional views of another embodiment of the inductive head according to the present invention.
Figure 4B:
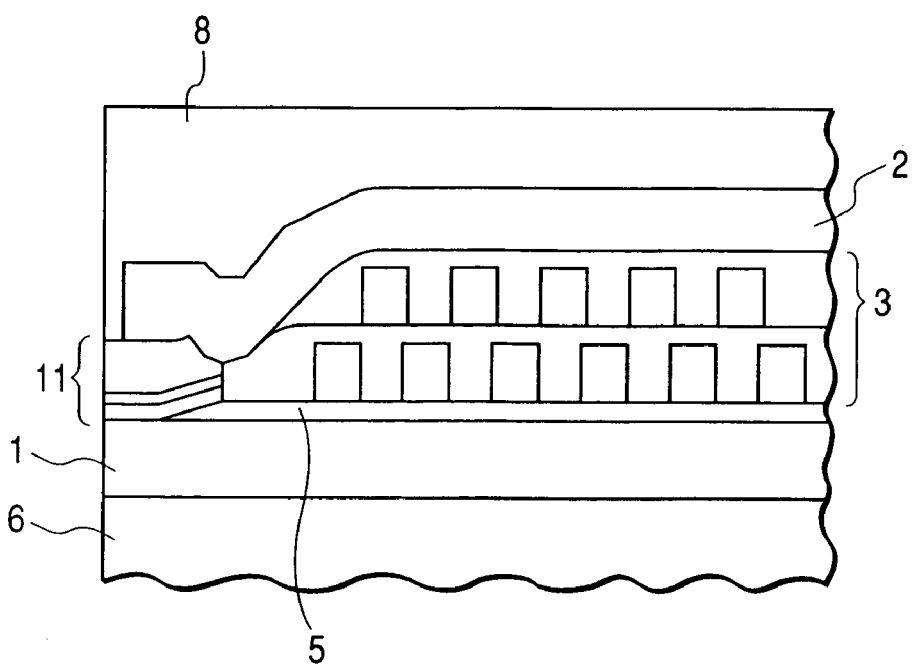

FIGS; 4(a–b) show a cross-sectional view of the inductive head of another embodiment of the present invention. As shown in FIGS. 1(a)–(b), forming the magnetic pole tip layer 11 on the flat lower magnetic core 1 makes it easy to process a small track width. A non-magnetic layer 5 is interposed between the rear portion of the magnetic pole tip layer 11 and the lower magnetic core 1 so as to give a higher recording magnetic field. The same effect can be given, when the top portion of the magnetic pole tip layer is subjected to flattening treatment, as shown in FIG. 4(a) or it is not subjected to flattening treatment, as shown in FIG. 4(b).

FIGS. 5(a–b) show a cross-sectional view of a further embodiment of the inductive head of the present invention. In FIGS. 5(a–b), the magnetic gap layer 10 is formed at least near the gap on the lower magnetic core 1, a non-magnetic layer 5 separating the rear portion of the magnetic pole tip layer 11 from the magnetic gap layer 10 is formed, so as to define the magnetic pole tip layer 11. Subsequently, using a mask including the magnetic pole tip layer 11, the magnetic gap layer 10 in a region not covered with the mask at least near the air bearing surface and the top region of the lower magnetic core are etched away by ion milling or R.I.E, so as to form the lower magnetic core 1 and the magnetic pole tip layer 11 having a desired track width. As in this embodiment, the magnetic pole tip layer 11 includes the magnetic gap layer 10 formed on the non-magnetic step layer. As the angle of extension of the magnetic pole tip layer is increased, or the position of extension is close to the air bearing surface, the magnetic field is higher. However, as the angle of extension of the magnetic pole tip layer 11 is increased, or the position of extension is close to the lifting surface, it is difficult to process the top surface of the lower magnetic core near the lifting surface into the shape having a desired track width.

In the present invention, the magnetic pole tip layer 11 having a small angle of extension is formed, and then the magnetic gap layer and the top portion of the lower magnetic core are processed into a desired shape. Thereafter, the rear portion of the magnetic pole tip layer is etched to be connected to the upper magnetic core 2 having a width larger than the magnetic pole tip layer. Thus, it is possible to provide an inductive head having high accuracy for the track width process and an intense magnetic field. The same effect can be given, when the top portion of the magnetic pole tip layer is subjected to flattening treatment, as shown in FIG. 5(a) or it is not subjected to flattening treatment, as shown in FIG. 5(b).

Figure 5A:
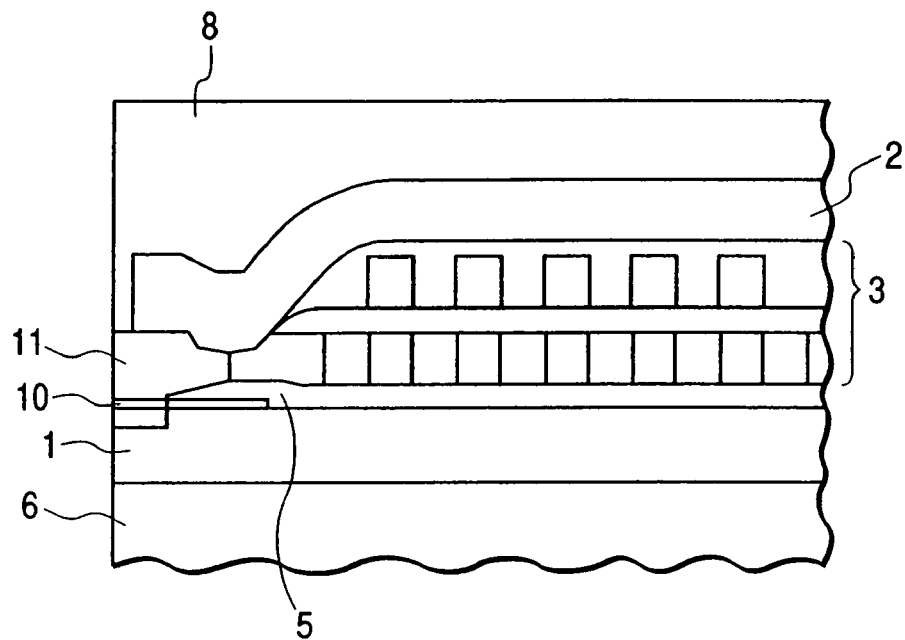
FIGS. 5(a)–(b) are cross-sectional views of a further embodiment of the inductive head according to the present invention.
Figure 5B:
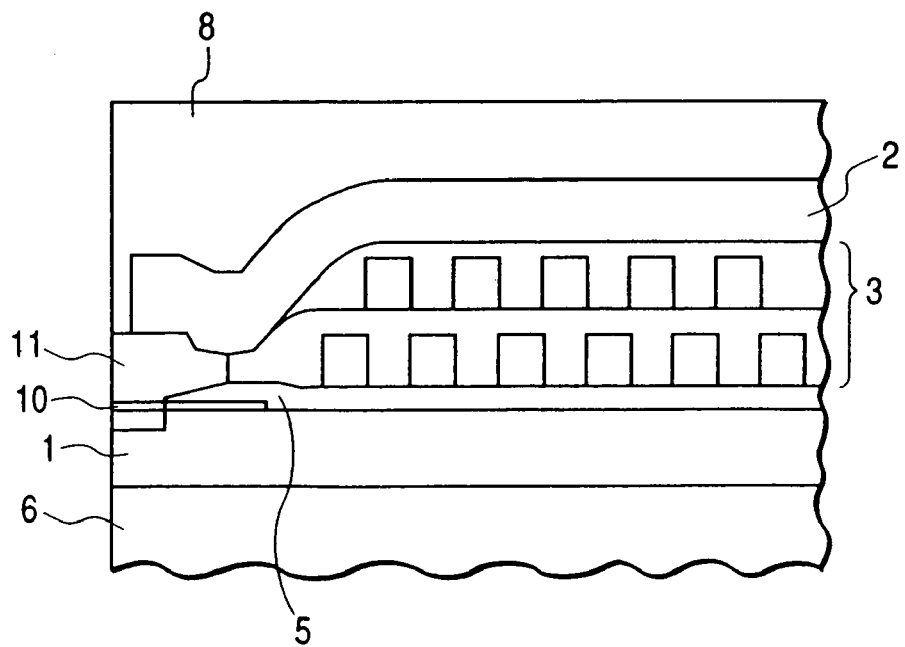

With respect to the shape of FIG. 5(a), the three dimensional magnetic field simulator under the following conditions is used to calculate the magnetic field. The lower magnetic layer comprises two layers made by laminating Co—Ni—Fe(1.9 T) of 0.5 µm on 40 to 60Ni-60 to 40Fe(1.6 T) of 2.5 µm. The thickness of the gap layer is 0.2 µm, the thickness of the magnetic pole tip layer is 2.0 µm, and the saturation magnetic flux density is 1.9 T of Co—Ni—Fe. In the magnetic pole tip layer, the width from the front end to 0.5 µm is 0.34 µm, and then the shape is extended at a 20° angle to 3.0 µm. The front end of the lower magnetic core has a structure such that the region not covered with the magnetic pole tip layer or the non-magnetic step layer is etched by 0.5 µm. In the upper magnetic core, the width from the flying surface to 0.5 µm is 1.34 µm, and then the shape is extended at the angle of extension of 40° to the core width of 30 µm. The thickness of the upper magnetic core is 3.0 µm, and the saturation magnetic flux density is 1.6 T. The magnetomotive force is 0.36 At. The maximum magnetic field is 647 kA/m (8.15 kOe), so as to give a recording magnetic field having an intensity slightly higher than that of the shape of FIG. 2(d). The portion of Co—Ni—Fe is changed to Fe—Co (2.3 T) so as to give a maximum magnetic field of 722 kA/m (9.10 kOe).

Figure 6A:
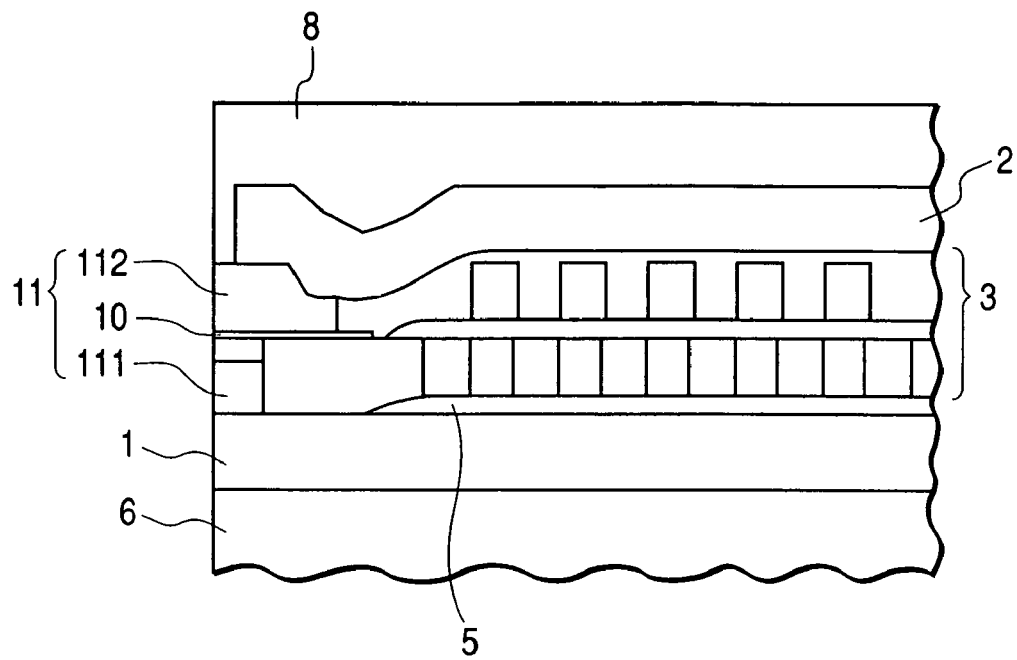
FIGS. 6(a)–(b) are cross-sectional views of a still another embodiment of the inductive head according to the present invention.
Figure 6B:
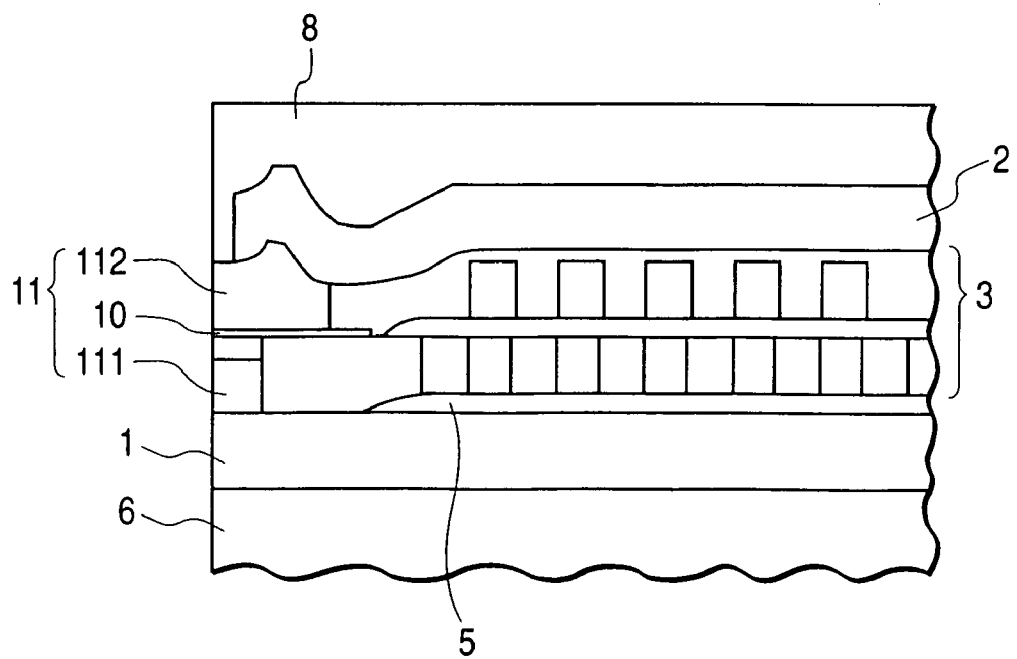

FIGS. 6(a)–(b) show cross-sectional views of a still another embodiment of the inductive head of the present invention. In the embodiment of FIGS. 6(a)–(b), the coils 3 are formed on the lower magnetic core 1, and then the lower side layer of the magnetic pole tip layer 111 is formed at least near the gap on the lower magnetic core 1. After flattening treatment, the magnetic gap layer 10 and the upper side layer of the magnetic pole tip layer 112 are formed. Subsequently, using a mask including the upper side layer of the magnetic pole tip layer, the magnetic gap layer 10 in a region not covered with the mask at least near the lifting surface and the top region of the lower side layer of the magnetic pole tip layer 111 are etched away by ion milling or R.I.E, so as to form the magnetic pole tip layer 11 having a desired track width. Then, after forming the coils 3, the rear end of the upper side layer of the magnetic pole tip layer 112 is etched away by ion milling or R.I.E. Finally, the upper magnetic core 2 is formed. The same effect can be given, when the top portion of the magnetic pole tip layer is subjected to flattening treatment, as shown in FIG. 6(a) or it is not subjected to flattening treatment, as shown in FIG. 6(b).

Figure 7:
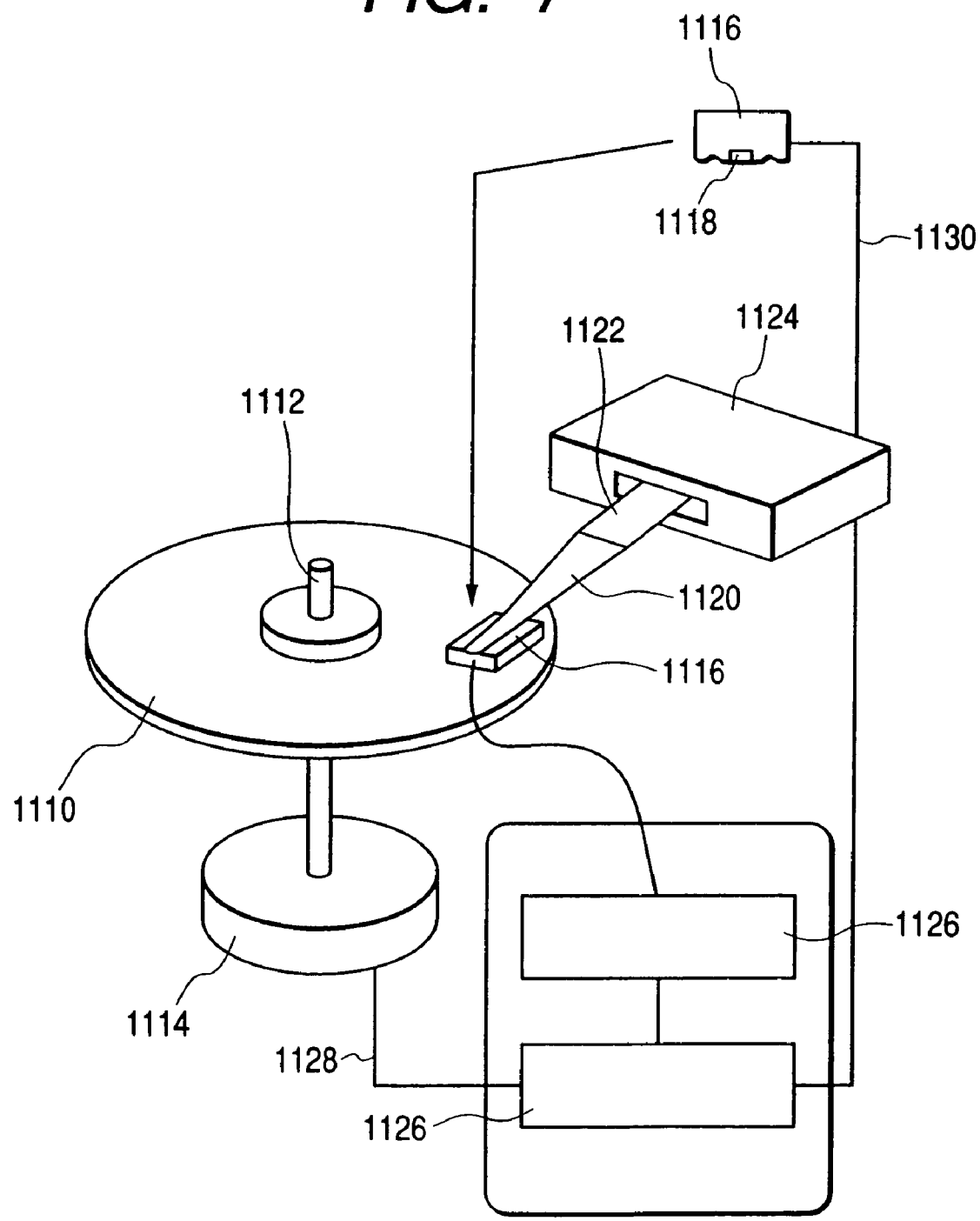
FIG. 7 is a diagram showing a magnetic disk apparatus using the inductive head according to the present invention.

FIG. 7 is a diagram showing a magnetic disk apparatus of one embodiment using the inductive head according to the present invention. There is shown an outline such that the inductive head according to the present invention is applied to the magnetic disk apparatus as a magnetic recording apparatus. The inductive head of the present invention can be mounted on a magnetic recording apparatus such as a magnetic tape apparatus.

The magnetic disk apparatus illustrated comprises a magnetic disk 1110 as a magnetic recording media formed on the disk for recording data in a recording region called a concentric track, a magnetic head 1118 according to the present invention comprising a magnetic transducer for reading and writing the data, actuator means for supporting the magnetic head 1118 to move it to a predetermined position on the magnetic disk 1110, and control means for controlling transmission and receive of data by read and written by the magnetic head 1118 and movement of the actuator means.

A plurality of magnetic disk apparatuses are connected to form a disk array apparatus having a large storage capacity.

Embodiments of the present invention can provide an inductive head which can prevent the adjacent information from being damaged, have a small track width, and provide an intense magnetic field.

What is claimed is:

1. A magnetic disk apparatus comprising a magnetic recording media, a motor to drive the magnetic recording media, a magnetic head to read from and write onto the magnetic recording media, and a mechanism for positioning the magnetic head, wherein at least one inductive head is mounted as the magnetic head, said inductive head comprising a lower magnetic core formed on a substrate, a magnetic pole tip layer formed on the lower magnetic core wherein said magnetic pole tip layer comprises three layers of magnetic layer/non-magnetic layer/magnetic layer, an upper magnetic core coupled in its front end to the magnetic pole tip layer, coupled in its rear end to the lower magnetic core, having a width of the front end smaller than that of the rear end, and having at least partially a shape gradually reducing the width from the rear end to the front end, coils disposed between the upper magnetic core and the lower magnetic core, and an insulating layer formed between the coils and the upper magnetic core or the lower magnetic core, wherein the distance between the upper magnetic core and the lower magnetic core in a rear end region away from an air bearing surface in a region connecting the magnetic pole tip layer to said upper magnetic core is shorter than the distance between the top surface of said magnetic pole tip layer in the air bearing surface and said lower magnetic core, and wherein a width of the front end of the upper magnetic core is larger than that of a rear end of the magnetic pole tip layer, a width of the magnetic pole tip layer of said magnetic head in the air bearing surface is not more than 0.5 µm, a saturation magnetic flux density of the magnetic layer consisting of the magnetic pole tip layer is not less than 1.6 T, and a coercivity of the magnetic recording media is 317 to 634 kA/m (4.0 to 8.0 kOe), and said three layers of magnetic layer/non-magnetic layer/magnetic layer of said magnetic pole tip layer have the same shape as viewed from top, and have an angle of extension of 5° to 45°.

2. The magnetic disk apparatus according to claim 1, comprising a magnetic gap layer formed at least near the air bearing surface on said lower magnetic core, a non-magnetic layer formed in a region such that at least the magnetic gap layer is distanced from the air bearing surface and having a thickness increased with moving away from the air bearing surface, and said magnetic pole tip layer is formed on the non-magnetic layer.

3. The magnetic disk apparatus according to claim 2, wherein said magnetic pole tip layer is formed on the lower magnetic core near the air bearing surface, and is formed on the non-magnetic layer in a region away from the air bearing surface.

4. The magnetic disk apparatus according to claim 1, wherein the front end of said upper magnetic core is recessed from the air bearing surface by 0.2 to 3.0 µm.

5. The magnetic disk apparatus according to claim 1, wherein a saturation magnetic flux density of the magnetic pole tip layer is higher than that of any one of at least the upper magnetic core and the lower magnetic core.

6. An inductive head comprising a lower magnetic core formed on a substrate, a magnetic pole tip layer formed on the lower magnetic core wherein said magnetic pole tip layer comprises three layers of magnetic layer/non-magnetic layer/magnetic layer, an upper magnetic core coupled in its front end to the magnetic pole tip layer, coupled in its rear end to the lower magnetic core, having a width of the front end smaller than that of the rear end, and having at least partially a shape gradually reducing the width from the rear end to the front end, coils disposed between the upper magnetic core and the lower magnetic core, and an insulating layer formed between the coils and the upper magnetic core or the lower magnetic core, wherein the distance between the upper magnetic core and the lower magnetic core in a rear end region away from an air bearing surface in a region connecting the magnetic pole tip layer to said upper magnetic core is shorter than the distance between the top surface of said magnetic pole tip layer in the air bearing surface and said lower magnetic core, and wherein a width of the front end of the upper magnetic core is larger than that of a rear end of the magnetic pole tip layer, wherein said three layers of magnetic layer/non-magnetic layer/magnetic layer of said magnetic pole tip layer have the same shape as viewed from top, and have an angle of extension of 5° to 45°.

* * * * *